United States Patent [19]

Maruo

[11] Patent Number: 5,790,694
[45] Date of Patent: Aug. 4, 1998

[54] IMAGE PROCESSING METHOD FOR INSPECTING WITH ANALYSIS OF BINARIZED HIGH AND LOW PASS INFORMATION IN WAVELET TRANSFORMED IMAGE DATA

[75] Inventor: Kazuyuki Maruo, Sendai, Japan

[73] Assignee: Advantest Corporation, Tokyo, Japan

[21] Appl. No.: 760,142

[22] Filed: Dec. 3, 1996

[30] Foreign Application Priority Data

Dec. 5, 1995 [JP] Japan .................................. 7-316713

[51] Int. Cl.$^6$ .................................................. G06K 9/40
[52] U.S. Cl. .................... 382/149; 382/260; 382/263; 382/264; 382/275; 382/277; 382/237
[58] Field of Search .................................. 382/141, 149, 382/262, 263, 264, 237, 275, 277, 260; 324/770, 753; 358/463

[56] References Cited

U.S. PATENT DOCUMENTS

| | | | |
|---|---|---|---|
| 5,504,438 | 4/1996 | Henley | 324/770 |
| 5,586,058 | 12/1996 | Aloni et al. | 364/552 |
| 5,717,780 | 2/1998 | Mitsumune et al. | 382/141 |

*Primary Examiner*—Scott Rogers
*Attorney, Agent, or Firm*—Staas & Halsey

[57] ABSTRACT

Input image data is wavelet-transformed in correspondence with each position on its frame ($S_1$), a combination image area of X-axis (or Y-axis) high-pass information and Y-axis (or X-axis) low-pass information in the transformed image data is subjected to binary processing ($S_3$), an isolated point is removed from the binary image data ($S_4$), after which the number of pixels of a value "1" is counted ($S_5$), and the device under test is judged as non-defective or defective, depending on whether the count value is larger than a predetermined value ($S_7$).

16 Claims, 4 Drawing Sheets

IMAGE PROCESSING METHOD FOR INSPECTING WITH ANALYSIS OF BINARIZED HIGH AND LOW PASS INFORMATION IN WAVELET TRANSFORMED IMAGE DATA

BACKGROUND OF THE INVENTION

The present invention relates to an image processing method for an picture quality tester which tests an object through the use of its image, such as an LCD (Liquid Crystal Display) tester or CCD tester and an image recognizer which recognizes an object through the use of its image.

There have been proposed a wide variety of image processing methods for testing, recognizing, and diagnosing objects through the use of their images. These methods are mostly designed for digital images and perform image processing by a computer.

The digital image that is handled by the picture quality testing method for the LCD or CCD tester is an array of pixels (points forming an image of one frame) of, for example, 256- or 1024-step gradation with 640 rows and 480 columns. For example, when this digital image is a uniform gray image, all the pixels will have the same value (i.e. the same density value) if the image is an ideal one. In practice, however, there is no chance of all the pixels having the same value since the image signal contains noise of about the same level as that of the signal and the pixel values vary to some extent. For example, an image composed of pixels with a 1024-step gradation looks uniform and fine if the variations in the pixel values is approximately ±20.

When image signal from the CCD or LCD under test has a defect and the variation in the pixel values is greater than the above-mentioned one, for example, when only one of pixels in some image area has a pixel value as large as 500 but the surrounding pixels have values of 400 or so, the abnormality will readily be noticed.

Such a pixel is called a defect. A single pixel whose value differs from those of the surrounding pixels in excess of a certain value is called a point defect and an aggregation of such point defects in a line a line defect.

Furthermore, even in the case where pixels of somewhat larger or smaller pixel values than those of the surrounding pixels, but not to such an extent as to be recognized as point defects individually, gather in a particular area of the image, or where variations in the pixel value in a particular area of the image is greater than in the other areas, the image will readily be recognized to be uneven in that area. A defect by an aggregation of such pixels is called an area defect.

It is a picture quality tester that detects these defects of an image and judges whether the image is good or not. The picture quality tester performs image processing and outputs information about the positions and areas of such defects.

Conventionally, threshold processing is used to detect the point defect and the line defect in the image from the device under test. The point and line defects have a property that they are detected basically as single or individual points; since the pixel values in the defective part are sufficiently large or small as compared with variations in the pixel values of the surrounding pixels, it is customary in the prior art to simply set a threshold value, recognize pixels as bright or dark defects, depending on whether their pixel values larger or smaller than the threshold value, and output the number of the defective pixels and the pixel value of each defect.

In contrast to the above, the detection of the area defect involves complex processing. The reason for this is that since the pixel value of each pixel forming the area defect is absorbed in the pixel value variations of pixels which do not constitute the area defect, it cannot be judged from a single piece of image information whether the pixel is a defect or noise. At present, the area defect is detected using such a scheme as described below, for instance.

In the first place, an original image A from the device under test is subjected to median filter processing to generate an image B free from noise components of point defects. This is followed by creating a difference image C between the filtered image B and the original one A. This provides an image composed of only noise components of point defects.

The difference image C is subjected to binarization to generate a binary image D. With this binary processing, pixels which have pixel values larger than a threshold value and are likely to become defects are set as active pixels of a value 1, whereas pixels of pixel values smaller than the threshold value are set as inactive pixels of a value 0. The pixels of the value 1 in the binary image indicate components of noise, point, line and area defects. In the binary image D the area defect portion has a higher density of pixels of the value 1 than in the other areas. The binary image d is subjected to image processing which remove therefrom isolated points (pixels of the value 1 but each surrounded by eight pixels of the value 0).

The image having thus removed therefrom the isolated points is subjected to labelling, by which pixels of the same label are grouped under the same label. That is, pixels of the value 1 in the binary image D are searched and labelled, after which pixels concatenated with each pixel of the value 1 are grouped under the same label. Since the area defect is formed by an aggregation of pixels of the value 1, the area of each label (the number of pixels of the same group) is large.

The area of each label is calculated and only labels of areas larger than a predetermined value are left unremoved. This processing removes the noise components of point defects, and hence it permits the detection of area defects.

While there have already been established area defect detecting techniques such as described above, they are limited specifically to the detection of small area defects. With the conventional processing schemes, in the case of a defect of a large area, for example, where pixel value varies about one-third or over the entire area of the image frame, information on such a large area defect disappears at the time of generating the difference image C. No proposals have been made so far on the detection of such large area defects.

It is therefore an object of the present invention to provide a method which permits quantification of such large area defects.

SUMMARY OF THE INVENTION

According to a first aspect of the present invention, input digital image data is wavelet-transformed in correspondence with the position on the image frame, and an area of the transformed image data formed by a combination of high-pass and low-pass information is subjected to threshold processing to separate pixels in that area into active pixels "1" and inactive pixels "0" to obtain binary image data, followed by counting the number of active pixels in the binary image data.

The number of active pixels may be counted after removing isolated points from the binary image data. The counting of the number of active pixels can be substituted with checking the binary image data for a concatenation of active pixels of more than a predetermined number, or labelling the active pixels and making a check for a label of an area larger than a predetermined value. It is also possible to make such a check on the frame of the image subjected to the binary processing for isolated-point-removal processing.

Depending on whether the number of pixels thus counted is larger or smaller than a predetermined value, it is determined whether the device under test, which is the source of the input digital image data, is non-defective or not. The wavelet transform is a signal processing scheme for analyzing a time-domain signal after converting it to a frequency-domain signal. The outline of the wavelet transform is given in, for example, Charles K. CHUI, "*An Introduction to WAVELETS,*" Academic Press, 1992, Chapters 1 (An Overview) and 3 (*Wavelet Transforms and Time-Frequency Analysis*). In image processing, the position on the display screen is used in place of the point in the time-domain, that is, in the processing in the X-axis direction, the X-coordinates of respective pixels are used, then the pixel values at those positions, that is, luminance values, are plotted, and the resulting coordinate system is wavelet-transformed on the same principle as that of the time-frequency analysis, after which the same analysis is made repeatedly. The wavelet transform of images is described in M.Barland, "*Wavelets in Image communication,*" ELSEVIER, 1994.

According to a second aspect of the present invention, the input digital image data is wavelet-transformed in correspondence with the position on the frame forming the image, followed by calculating the quantity of image energy of the high-pass and low-pass information combined area of the wavelet-transformed image. Depending on whether the quantity of image energy is larger or smaller than a threshold value, it is determined whether the device under test is non-defective or defective.

The combination of the high-pass and low-pass information is a combination of high-pass information in the X-axis direction and low-pass information in the Y-axis direction, a combination of low-pass information in the X-axis direction and high-pass information in the Y-axis direction, or both of them.

The wavelet transform may be done a plurality of times, that is, an X-axis low-pass and Y-axis high-pass information combined part in the image data once wavelet-transformed may be subjected to the wavelet transform processing one or more times prior to the binary processing.

BRIEF DESCRIPTION OF THE DRAWINGS

FIGS. 2C through 2F show an concrete example of onedimensional wavelet transform processing, FIG. 2C being a diagram showing each data value of a data sequence prior to the wavelet transform, FIG. 2D a diagram showing each data of a data string after the wavelet transform, FIG. 2E a graph showing variations in the data of the data string s and FIG. 2F a graph showing variations in the data of the data string t;

FIG. 4A is a diagram showing an example of original image data containing an area defect;

FIG. 4B is a diagram showing image data obtained by a two-dimensional wavelet transform of the original image depicted in FIG. 4A; and FIG. 4C is a diagram showing image data obtained by a two-dimensional wavelet transform of the image depicted in FIG. 4B.

DESCRIPTION OF THE PREFERRED EMBODIMENT

Figure 1:
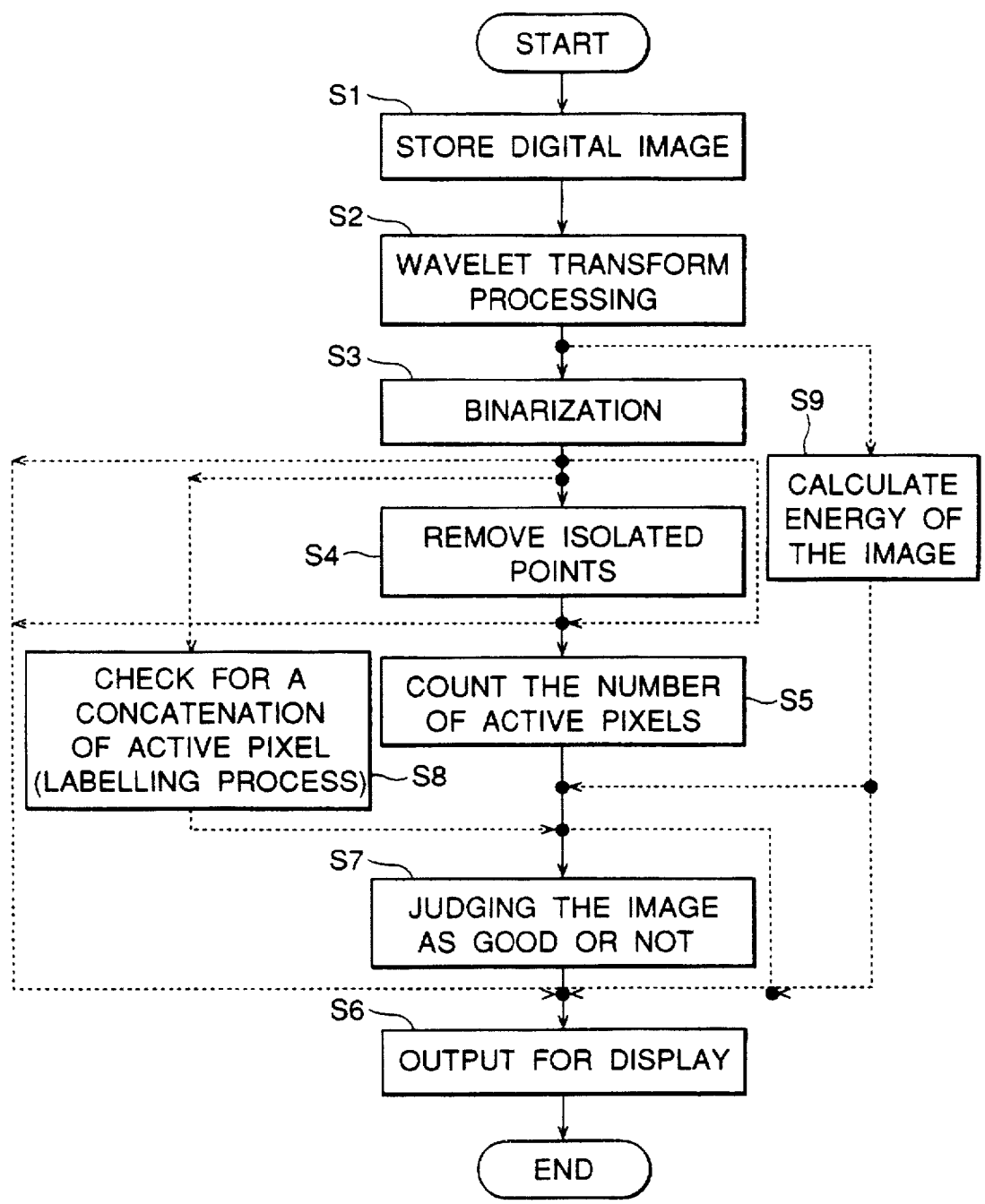
FIG. 1 is a flowchart showing the procedure of an embodiment of the present invention.
Figure 2A:
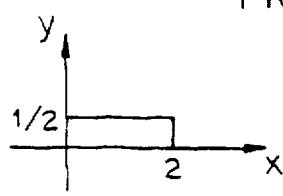
FIG. 2A is a graph showing an example of a scaling function.
Figure 2B:
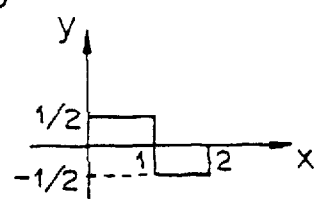
FIG. 2B is a graph showing an example of a wavelet function.
Figure 2C:
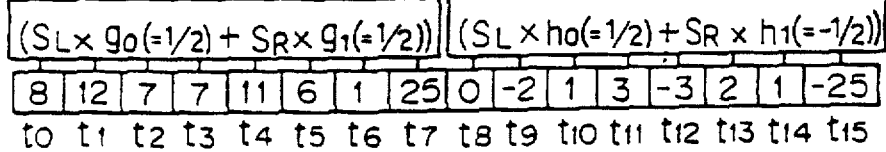
Figure 2D:
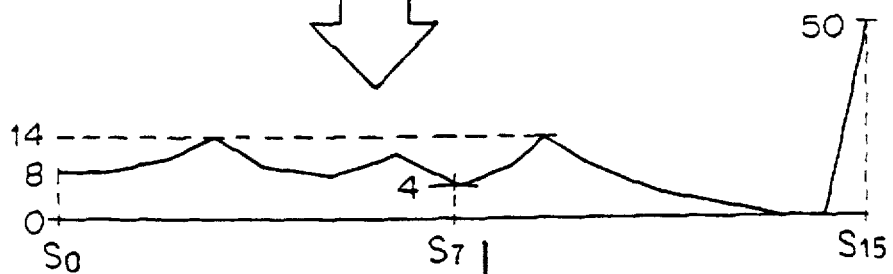
Figure 2E:
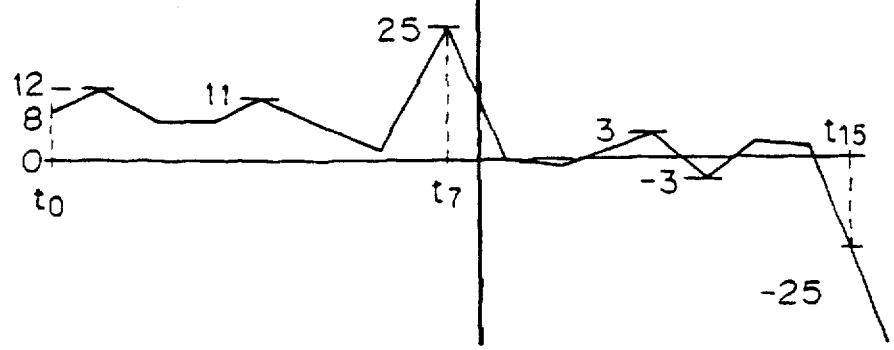

In FIG. 1 there is shown a flowchart for explaining an embodiment of the present invention.

In the first place, digital image data is stored in an image memory ($S_1$).

The image data is subjected to wavelet transform processing ($S_2$). The wavelet transform is described in the afore-mentioned literature but will briefly be described below.

The wavelet transform of image data is a two-dimensional transform, which is implemented by a combination of one-dimensional wavelet transforms of the image in the X- and Y-axis directions. The one-dimensional wavelet transform processing will be described first. While there are many basis functions available for wavelet transforms, the description will be given using a Haar wavelet of the simplest structure. Other basis wavelet functions (filter coefficients for wavelet transforms) are different in form but provide about the same output information.

In the wavelet transform, the basic function is composed of a scaling function and a wavelet function. The scaling function is a function for outputting data smoothing information (low-pass information) and the wavelet function is a function for outputting detailed information on data (high-pass information). In the case of the Haar wavelet, the scaling function is $g_0 = g_1 = \frac{1}{2}$ and the wavelet function is $h_0 = \frac{1}{2}$ and $h_1 = -\frac{1}{2}$.

A sequence of data $t_0, t_1, \ldots, t_{15}$, which results from the Haar transform processing of a data sequence composed of 16 pieces of data $s_0, s_1, s_2, \ldots, s_{15}$, can be obtained by the following calculations:

$$t_0 = g_0 \cdot s_0 + g_1 \cdot s_1, t_8 = h_0 \cdot s_0 + h_1 \cdot s_1$$
$$t_1 = g_0 \cdot s_2 + g_1 \cdot s_3, t_9 = h_0 \cdot s_2 + h_1 \cdot s_3$$
$$t_2 = g_0 \cdot s_4 + g_1 \cdot s_5, t_{10} = h_0 \cdot s_4 + h_1 \cdot s_5$$
$$\vdots$$
$$t_7 = g_0 \cdot s_{14} + g_1 \cdot s_{15}, t_{15} = h_0 \cdot s_{14} + h_1 \cdot s_{15}$$

In FIG. 2 there is shown a concrete method for performing a Harr wavelet transform of a data sequence composed of 16 pieces of data. FIG. 2A shows the scaling function and FIG. 2B the wavelet function. The data sequence composed of data $s_0, s_1, \ldots, s_{15}$ shown in FIG. 2C is subjected to the wavelet transform processing. That is, eight pairs of adjacent pieces of data in the sequence are taken out, then the left-hand numerical value $S_L$ of each pair is multiplied by $\frac{1}{2}$ (=$g_0$) and the right-hand numerical value $S_R$ is also multiplied by $\frac{1}{2}$ (=$g_1$), after which the multiplied results are added together to obtain a sequence of data $t_0, t_1, \ldots, t_7$. Furthermore, the left-hand numerical values $S_L$ of eight pairs are multiplied by $\frac{1}{2}$ (=$h_0$) and the right-hand numerical values $S_R$ are multiplied by $-\frac{1}{2}$ ($=h_1$), after which the multiplied results are added together to obtain a sequence of data $t_8, t_9, \ldots, t_{15}$. FIG. 2D shows concrete numerical values of the data sequence t obtained by the above calculations of concrete numerical values of the data sequence s shown in FIG. 2C. The first half $t_0, t_1, \ldots, t_7$ of the data sequence t is formed by low-pass information of a length one-half the entire length of the original data sequence s obtained through its multiplication by the scaling function, whereas the second half $t_8, t_9, \ldots, t_{15}$ is formed by high-pass information of a length one-half the entire length of the original data sequence s obtained through its multiplication by the wavelet function. FIG. 2E is a graph showing the data sequence s and FIG. 2F a graph showing the data sequence t. The abscissa represents the order of numerical values in the data sequences and the ordinate the numerical values.

This wavelet transform reduces resolution by half that of the original image but provides both low-pass and high-pass information of the original signal at the same time. The original signal has a resolution 16, whereas the data sequence $t_0$ to $t_{15}$ obtained by one wavelet transform represents low-pass information and high-pass information each having a resolution 8. For example, when the original signal contains noise of a value appreciably larger than the others, such as $s_{15}=50$ in FIGS. 2C and 2E, information of a large value $t_{15}=-25$ is output because of the noise although the high-pass information part of the data sequence t is usually composed of data of small absolute values. In this way, the wavelet transform can be utilized to detect the noise component of the original data.

Figure 3A:
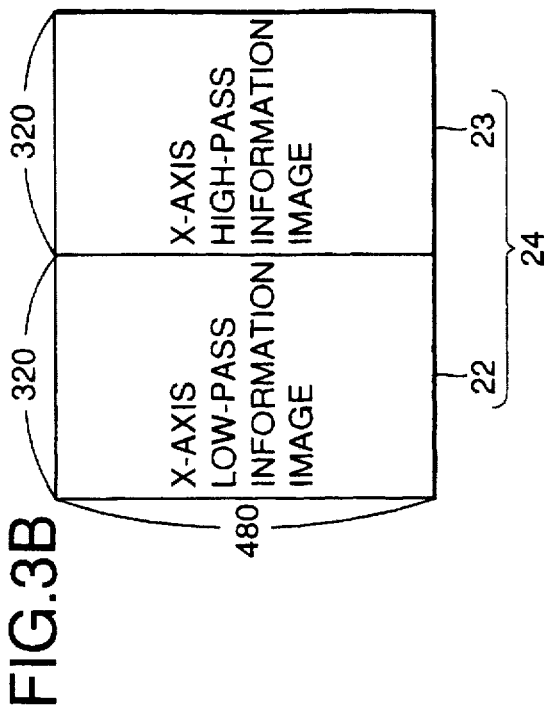
FIG. 3A shows a diagram showing an original image.
Figure 3B:
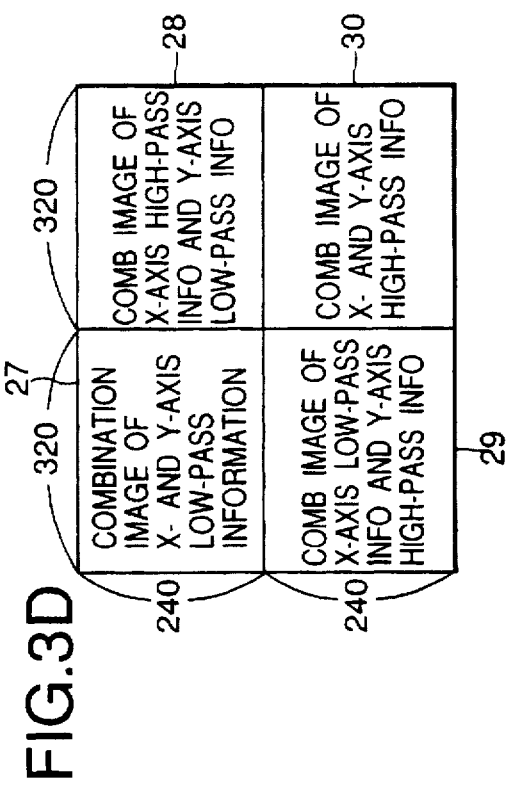
FIG. 3B shows an image obtained by wavelet-transforming the original image in the X-axis direction.
Figure 3C:
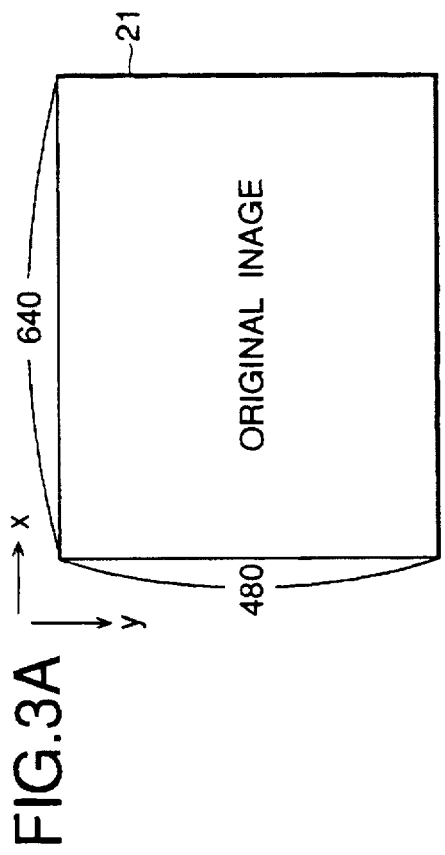
FIG. 3C shows an image obtained by wavelet-transforming the image of FIG. 3B in the Y-axis direction.
Figure 3D:
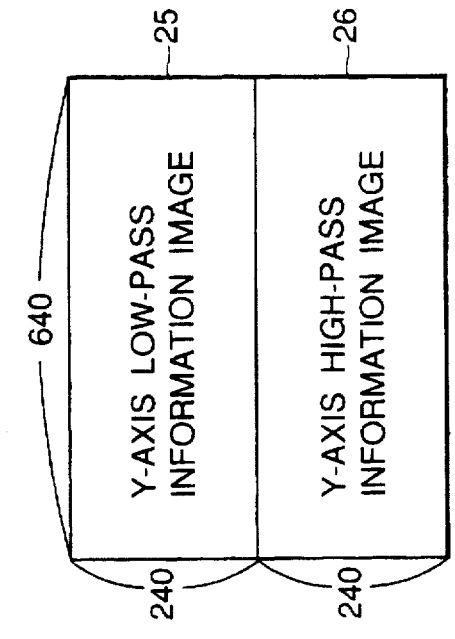
FIG. 3D is a diagram for explaining combinations of respective pixels of the images depicted in FIGS. 3B and 3C.

This wavelet transform scheme can also be applied to two-dimensional image data such as an LCD image. In FIG. 3 there is shown a concrete example of the application of the wavelet transform scheme to image data. In the FIG. 3 example, the original image 21 (FIG. 3A) is composed of 640-by-480 pieces of digital data. This image is wavelet-transformed first in the X-axis direction as is the case with one-dimensional data. That is, the wavelet transform of a sequence of 640 pieces of data in the X-axis direction (one-dimensional data) is performed for each of 480 sequences of data (one-dimensional data). As the result of this, the image is divided into a low-pass information image 22 at the left-hand side and a high-pass information image 23 at the right-hand side as shown in FIG. 3B. Then, an image 24 composed of 640-by-480 pieces of data shown in FIG. 3B is wavelet-transformed in the Y-axis direction. That is, the wavelet transform of a sequence of 480 pieces of data in the Y-axis direction (one-dimensional data) is performed for each of 640 data sequences in the Y-axis direction. By this, an image composed of 640-by-480 pixels is obtained as shown in FIG. 3C, wherein the upper half of the image is formed by a Y-axis low-pass information image 25 and the lower half by a Y-axis high-pass information image 26. Consequently, the image depicted in FIG. 3C has the same size as that of the original image 21 (640-by-480 pieces of data) and is divided into four as shown in FIG. 3D, wherein a combination image 27 of the X- and Y-axis low-pass information, a combination image 28 of the X-axis high-pass information and the Y-axis low-pass information, a combination image 29 of the X-axis low-pass information and the Y-axis high-pass information and a combination image 30 of the X- and Y-axis high-pass information are obtained in the upper left, upper right, lower left and lower right quarter areas, respectively. In this example, the wavelet transform is performed first in the X-axis direction, which is followed by the wavelet transform in the Y-axis direction to obtain the image shown in FIG. 3D, but even if the transform is performed first in the Y-axis direction, exactly the same image as shown in FIG. 3D can be obtained ultimately after the two-dimensional wavelet transform.

The LCD or CCD tester usually analyzes an uniform original image, for example, gray uniformly over the entire area thereof. When such a fine original image without defects is wavelet transformed, substantially no data appears in the transformed image other than the image containing the high-pass component, i.e. the X- and Y-axis low-pass information images, and the transformed image carries only noise components that are generated when capturing the image and is composed mostly of pixels having values close to zero. When the original image contains an area defect of a certain large value, however, pixels of large pixel values center on the defect-containing area in the high-pass information image of the wavelet-transformed image, that is, in the combination image 28 composed of the X-axis high-pass (detailed) information and the Y-axis low-pass (smoothing) information and in the combination image 29 composed of the X-axis low-pass (smoothing) information and the Y-axis high-pass (detailed) information. In the combination image 30 composed of the X- and Y-axis high-pass information, however, the pixel values are close to zero after the wavelet transform even in the area defect containing portion due to high-pass processing carried out twice, and consequently, no characteristic data appears in the defect-containing area.

Now, attention is paid to those images of the wavelet-transformed image which contain the low-pass information and the high-pass information, that is, the upper right image 28 and the lower left image 29 in FIG. 3D. The upper right image 28 contains defect information on a vertical line like component and the lower left image 29 defect information on a horizontal line like component. The subsequent processing may be performed only for the upper right image 28 or only for the lower left image 29 according to the purpose of image processing. It is also possible to perform the processing for both images 28 and 29 and use the results of the respective processing as analysis conclusions. Most of large area defects can be detected by carrying out an analysis of either one of the images 28 and 29.

In the above-mentioned noted area, that is, in one or both of the images 28 and 29, pixels of large pixel values appear in the area defect portion, and if dot-like noise components are present, they will appear as pixels of large pixel values in large quantities. Hence, whether the pixels of large pixel values are noise or form an area defect can be determined by making a check to see how many pixels gather in the area defect portion. To perform this, the original image is wavelet-transformed as described previously ($S_2$) with reference to FIG. 1, and the noted image (28 or 29, or both of them) is subjected to binary processing to convert the pixels to active and inactive pixels, generating a binary image with pixel values 0 and 1 ($S_3$). The threshold value for the binary processing may be a threshold value which is used to simply determine whether the pixel values are positive or smaller than zero. The binary image thus obtained is subjected to processing for removing therefrom isolated points ($S_4$). This processing can be done using conventional techniques. Since noise components are mostly isolated points, almost all of noise other than the area defect is removed by this processing. In other words, the pixels of the pixel value 1 in this image mostly form the area defect.

Thus, the number of pixels of the pixel value 1 in this image, that is, the number of active pixels, is counted ($S_5$) and the count value is output for display, for instance ($S_6$). By this, the size of the area defect can be calculated and, if necessary, it can be displayed. Since the pixels counted in this instance each correspond to four pixels of the original image, the size of the area defect in the original image could be obtained by computing the count value in correspondence with the reduction ratio used. Each image after the wavelet transform has an area one-quarter of that in the original image, that is, the original image bearing defect information is compressed down to ¼ by the binary processing or isolated point removing processing of the wavelet-transformed image; therefore, the processing of each wavelet-transformed image is equivalent to the processing of this compressed image. Hence, while according to the prior art an area defect by abnormal pixel values scattered or gathering over a wide image area is removed by the isolated point removal processing together with noise, the present invention increases the possibility of such an area defect being left unremoved and detected.

Further, the upper left image 27 (FIG. 3D) after the wavelet transform, that is, the image passed through the low-pass filter in both the X- and Y-axis directions, is an image reduced down to a quarter size of the original image, and hence it can be further wavelet-transformed. By wavelet-transforming again the upper left image area 27 in the once transformed image shown in FIG. 3D, the resulting image is further reduced down to a quarter size, i.e. a size 1/16 that of the original image 21. By subjecting the combination image of the low-pass and high-pass information in the transformed image to the same image processing as mentioned above, an area defect can also be detected. Since this processing is equivalent to processing of the original image in a four-by-four blocked state, it is possible to detect a larger area defect extending across a wider image area than that detectable in the once-wavelet-transformed image. One more wavelet transform of the upper left low-pass information area of the image reduced down to a 1/16 size is equivalent to processing of the original image in a eight-by-eight blocked state. By such a multi resolution wavelet transform of the image composed of 640 by 480 pixels, it is possible to detect a large area defect extending over the entire image area that could not have been detected in the past. Moreover, in such a repeatedly wavelet-transformed image, noise components of isolated points mostly disappear without the isolated point removal processing needed in the prior art—this permits the implementation of a system which performs the wavelet transform of the original image a plurality of times, then performs the binary processing of the wavelet-transformed image, and counts and outputs the number of pixels of the pixel value 1 as area information of an area defect to an output device without involving the isolated point removal processing. It is also possible to set a threshold value as a criterion of judging the image as defective or non-defective, depending on whether the size of the area defect, which is output as mentioned above, is larger than or smaller than the threshold value ($S_7$).

In the above, the isolated point removing step $S_4$ can be omitted, that is, the binary processing can immediately be followed by the counting step $S_5$. In other words, the image area is reduced down to a quarter size by one wavelet transform, and consequently, the influence of one pixel is lessened to ¼. Accordingly, the image size is reduced to 1/64 when the image is wavelet-transformed three times, and the influence of an isolated pixel of a value around 64 times larger than the normal pixel value is also lessened to 1/64 and hence is virtually negligible. Hence, if the maximum value of the isolated pixel is in the range of 60 to 70 times as large as the normal pixel value, the isolated point removing step $S_4$ can be omitted by performing the wavelet transform three times instead.

Figures 4A, 4B, 4C:
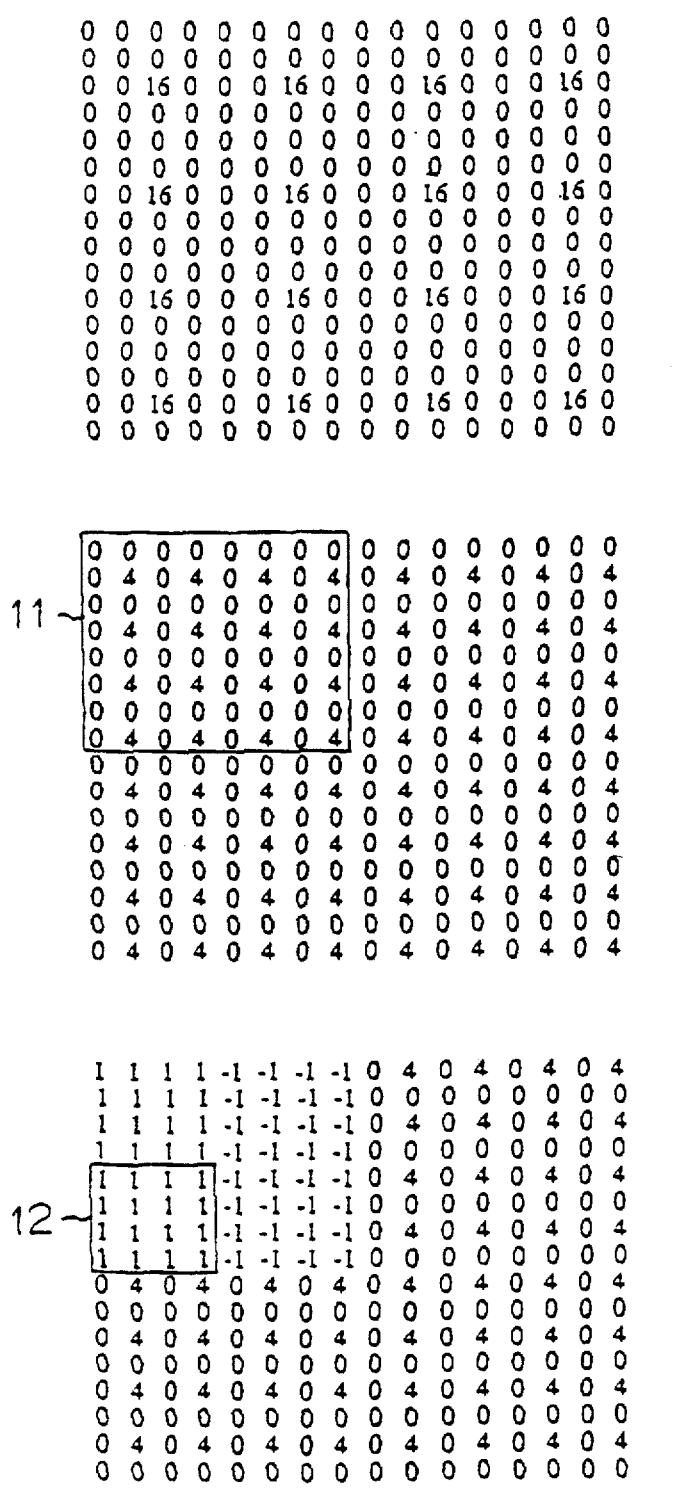

Now, consider an original image composed of 640 by 480 pixels and containing a wide area defect by pixels of a pixel value 16 scattered as pseudo point defects across a wide area at intervals of four pixels in row and column directions. FIG. 4A shows 16 by 16 pixels forming part of the area defect. If the image shown in FIG. 4A is processed using the conventional method, all the pixels of the pixel value 16 will be removed by the isolated point removal processing, and hence no area defect will be detected. In contrast thereto, according to the present invention, when once wavelet-transformed, the image becomes such as shown in FIG. 4B and, by wavelet-transforming the upper left X- and Y-axis low-pass information image (eight by eight pixels) 11, an image depicted in FIG. 4C is obtained. Even if the binary processing and the isolated point removal processing are conducted on an combination image (four by four pixels) 12 of the X-axis low-pass information and the Y-axis high-pass information in the second wavelet-transformed image, the pixels of the pixel value 1 are not removed and remain intact. In this instance, the 16 pixels forming the image 12 all have the pixel value 1, from which it is judged that the image 12 is an area defect, and it can be judged that the area defect spreads over the entire image area composed of 16 by 16 pixels in the original image.

This example performs the wavelet transform in two levels and utilizes the results of the second transform, but in the case of the image composed of 640 by 480 pixels, for instance, it is also possible to perform the wavelet transform in three stages and subject the combination area of the high-pass and low-pass information in the third wavelet-transformed image. The number of times the wavelet transform is performed, the size of the original image and the size of the object to be detected can suitably be chosen according to the purpose of image processing. In this way, the present invention permits the detection of wide area defects that could not have been detected in the past.

To an LCD panel composed of 640 by 480 pixels, each having a 256-step gradation, was applied a luminance signal which provided a luminance level of 128 to each pixel, the image produced on the display screen of the LCD panel was videotaped, the image signal thus obtained was wavelet-transformed three times, and the signal of the area corresponding to the lower left image 29 in FIG. 3D was subjected to the processing of steps $S_3$, $S_4$ and $S_5$ shown in FIG. 1. This experiment was conducted on 21 LCD panels. The numbers of active pixels counted on the LCD panels are shown below in ascending order of the count value.

| Sample No. | Number of Active pixels | Sample No. | Number of Active pixels |
| --- | --- | --- | --- |
| 1 | 106 | 12 | 616 |
| 2 | 150 | 13 | 704 |
| 3 | 204 | 14 | 1172 |
| 4 | 256 | 15 | 1208 |
| 5 | 334 | 16 | 1304 |
| 6 | 348 | 17 | 1864 |
| 7 | 388 | 18 | 1920 |
| 8 | 410 | 19 | 2140 |
| 9 | 458 | 20 | 2148 |
| 10 | 480 | 21 | 2788 |
| 11 | 530 | | |

The display image on each sample was human-eye-checked for a large area defect and comparison was made between the visual inspection results and the above-mentioned number of active pixels. In the above, samples Nos. 17 to 21 have large area defects that an image area with a 2% or more mean luminance level variation occupies ⅓ to ½ the entire area of the panel, and the number of active pixels is 1864 or more. On the other hand, samples Nos. 1 to 16 have no such large area defects and the number of active pixels in these samples is smaller than 1300. Thus, according to present invention, the difference in the number of active pixels between the non-defective and the defective is so great that large area defects can be detected.

The procedure shown in FIG. 1 may be modified so that the binary processing step $S_3$ or isolated point removing step $S_4$ is followed by a step $S_8$ of making a check for a concatenation of more than a predetermined number of active pixels as indicated by the broken line; in this instance, if such a concatenation of active pixels is found in step $S_8$, the image is judged as defective in step $S_7$. It is also possible to perform labelling in step $S_8$ and judge the device under test as defective in step $S_9$ if it contains a label of an area greater than a predetermined value. While the pass/fail judgement can automatically be made as described above, it is also possible to employ a system in which, after the binary processing step $S_3$ or isolated point removing step $S_4$, the binary image signal obtained at that time is displayed as an image on a display in step $S_6$ so that an inspector visually inspects the distribution and spread of active pixels for the pass/fail judgement.

In step $S_9$ indicated by the broken line in FIG. 1, the amount of energy of the image area to be analyzed, for example, the lower left image 29 in FIG. 3D, is calculated directly following the wavelet transform processing in step $S_3$. The amount of image energy E is given by the following equation:

$$E = \sum_{i=1}^{N} x(i)^2/N$$

where N is the number of pixels contained in the image 29 and x(i) the pixel value of each pixel.

This image energy is substantially in proportion to the value counted in step $S_5$ in FIG. 1. Accordingly, the amount of image energy E is compared with a threshold value, then the image of the input image signal is judged as defective or non-defective, depending on whether the amount of image energy E is larger or smaller than the threshold value, and the result is output ($S_7$) or the computed amount of image energy E is displayed ($S_6$).

As described above in detail, the present invention permits recognition of large area defects in an image of a very low SN ratio which could not have been detected by the conventional microscopic image processing. With the present invention, it is possible to make the same judgement as that by the ability of the human eye which judges images from a macroscopic viewpoint—this is of great utility in practice. The computation of the amount of image energy in FIG. 1 reduces the amount of data to be processed and hence permits fast processing more than in the case of involving the binary processing, the isolated point removal and the counting of pixel numbers.

It will be apparent that many modifications and variations may be effected without departing from the scope of the novel concepts of the present invention.

What is claimed is:

1. An image processing method for inspecting, recognizing or diagnosing an object through utilization of its image, comprising:

a wavelet-transforming step of wavelet-transforming input digital image data in correspondence with each position on a frame forming said image;

a binary processing step of obtaining binary image data composed of active and inactive pixels by performing threshold processing of pixel values of respective pixels in a combination image area of high-pass information and low-pass information in said wavelet-transformed image data; and a pixel number counting step of counting the number of active pixels in said binary image data.

2. The method of claim 1, further comprising an isolated point removing step of removing from said binary image data an isolated pixel in its image and setting said isolated point removed binary image data as binary image data in said counting step.

3. The method of claim 1, wherein said wavelet transforming step is a step of further wavelet-transforming at least once a combination image area of an X-axis low-pass information and Y-axis low-pass information in said image data obtained by wavelet-transforming said input digital image data, and providing image data wavelet-transformed a plurality of times to said binary processing step.

4. The method of claim 2, wherein said wavelet transforming step is a step of further wavelet-transforming at least once a combination image area of an X-axis low-pass information and Y-axis low-pass information in said image data obtained by wavelet-transforming said input digital image data, and providing image data wavelet-transformed a plurality of times to said binary processing step.

5. The method of claim 1, further comprising a pass/fail judgement step for judging whether the device under test, which is the source of said input digital image data, is non-defective or defective, depending on whether said number of active pixels is smaller than or larger than a predetermined value.

6. The method of claim 5, wherein said combination image area of high-pass information and low-pass information in said binary processing step is composed of both of a combination image area of X-axis high-pass information and Y-axis low-pass information and a combination image area of Y-axis high-pass information and X-axis low-pass information.

7. An image processing method for inspecting, recognizing or diagnosing an object through utilization of its image, comprising:

a wavelet-transforming step of wavelet-transforming input digital image data in correspondence with each position on a frame forming said image; and an energy amount calculating step of calculating the amount of image energy in a combination image area of high-pass information and low-pass information in said wavelet-transformed image data.

8. The method of claim 7, wherein said wavelet transforming step is a step of further wavelet-transforming at least once a combination image area of an X-axis low-pass information and Y-axis low-pass information in said image data obtained by wavelet-transforming said input digital image data, and providing image data wavelet-transformed a plurality of times to said binary processing step.

9. The method of claim 7, further comprising a pass/fail judgement step for judging whether the device under test, which is the source of said input digital image data, is non-defective or defective, depending on whether said number of active pixels is smaller than or larger than a predetermined value.

10. The method of claim 9, wherein said combination image area of high-pass information and low-pass information in said binary processing step is composed of both of a combination image area of X-axis high-pass information and Y-axis low-pass information and a combination image area of Y-axis high-pass information and X-axis low-pass information.

11. An image processing method for inspecting, recognizing or diagnosing an object through utilization of its image, comprising:

- a wavelet-transforming step of wavelet-transforming input digital image data in correspondence with each position on a frame forming said image;
- a binary processing step of obtaining binary image data composed of active and inactive pixels by performing threshold processing of pixel values of respective pixels in a combination image area of high-pass information and low-pass information in said wavelet-transformed image data;
- a step of detecting the concatenation of said active pixels in said binary image data; and
- a pass/fail judgement step of judging the device under test, which is the source of said input digital image data, as defective when the number of concatenated pixels is larger than a predetermined value.

12. An image processing method for inspecting, recognizing or diagnosing an object through utilization of its image, comprising:

- a wavelet-transforming step of wavelet-transforming input digital image data in correspondence with each position on a frame forming said image;
- a binary processing step of obtaining binary image data composed of active and inactive pixels by performing threshold processing of pixel values of respective pixels in a combination image area of high-pass information and low-pass information in said wavelet-transformed image data;
- a step of labelling said active pixels in said binary image data; and
- a pass/fail judgement step of judging the device under test, which is the source of said input digital image data, as defective when the area of the label is larger than a predetermined value.

13. An image processing method for inspecting, recognizing or diagnosing an object through utilization of its image, comprising:

- a wavelet-transforming step of wavelet-transforming input digital image data in correspondence with each position on a frame forming said image;
- a binary processing step of obtaining binary image data composed of active and inactive pixels by performing threshold processing of pixel values of respective pixels in a combination image area of high-pass information and low-pass information in said wavelet-transformed image data;
- a step of displaying said binary image data as a two-dimensional image; and
- a pass/fail judgement step of judging whether the device under test, which is the source of said input digital image data, is non-defective or defective on the basis of said displayed image.

14. The method of claim 11, further comprising an isolated point removing step of removing from said binary image data an isolated pixel in its image and providing said isolated point removed binary image data to the next step.

15. The method of claim 11, wherein said wavelet transforming step is a step of further wavelet-transforming at least once a combination image area of an X-axis low-pass information and Y-axis low-pass information in said image data obtained by wavelet-transforming said input digital image data, and providing image data wavelet-transformed a plurality of times to said binary processing step.

16. The method of claim 15, wherein said combination image area of high-pass information and low-pass information in said binary processing step is composed of both of a combination image area of X-axis high-pass information and Y-axis low-pass information and a combination image area of Y-axis high-pass information and X-axis low-pass information.

* * * * *